(12) United States Patent
Dent

(10) Patent No.: US 9,323,057 B2
(45) Date of Patent: Apr. 26, 2016

(54) MOBILE DEVICE, SYSTEM AND METHOD FOR CONTROLLING A HEADS-UP DISPLAY

(71) Applicant: RESEARCH IN MOTION LIMITED, Waterloo (CA)

(72) Inventor: Terrill Mark Dent, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 319 days.

(21) Appl. No.: 13/707,712

(22) Filed: Dec. 7, 2012

(65) Prior Publication Data

US 2014/0160002 A1   Jun. 12, 2014

(51) Int. Cl.
| | |
|---|---|
| G06F 3/01 | (2006.01) |
| G06F 3/02 | (2006.01) |
| G06T 1/00 | (2006.01) |
| G09G 5/00 | (2006.01) |
| G06T 7/00 | (2006.01) |
| G06T 11/00 | (2006.01) |
| G02B 27/01 | (2006.01) |
| G06F 3/038 | (2013.01) |
| G06F 3/0488 | (2013.01) |
| G06F 3/14 | (2006.01) |

(52) U.S. Cl.
CPC ............ *G02B 27/017* (2013.01); *G06F 3/038* (2013.01); *G06F 3/04886* (2013.01); *G06F 3/1431* (2013.01); *G02B 2027/014* (2013.01); *G02B 2027/0165* (2013.01); *G06F 2203/0384* (2013.01)

(58) Field of Classification Search
CPC ............ G06F 3/01; G06F 3/02; G09G 5/00; G09G 5/377; H04W 88/02; H04N 7/18; H04N 5/66; G01C 21/00; H04B 1/38

USPC .................................................. 345/156–184
See application file for complete search history.

(56) References Cited

U.S. PATENT DOCUMENTS

| | | |
|---|---|---|
| 6,304,234 B1 | 10/2001 | Horiuchi |
| 2006/0019614 A1 | 1/2006 | Yamasaki |
| 2011/0187547 A1* | 8/2011 | Kweon .................. 340/670 |
| 2011/0304646 A1* | 12/2011 | Kato ..................... 345/632 |
| 2012/0218188 A1* | 8/2012 | Kashitani ............... 345/168 |

(Continued)

FOREIGN PATENT DOCUMENTS

| | | |
|---|---|---|
| WO | 01/94156 A2 | 12/2001 |
| WO | 2009/054619 A2 | 4/2009 |

OTHER PUBLICATIONS

European Patent Application No. 12196027.2 Search Report dated May 15, 2013.
Layer Application (Android/IOS) http://www.layar.com/ Accessed: Oct. 18, 2012 (publication date).

(Continued)

*Primary Examiner* — Ilana Spar
*Assistant Examiner* — Nguyen H Truong
(74) *Attorney, Agent, or Firm* — Perry + Currier, Inc.

(57) ABSTRACT

A mobile device, system and method for controlling a heads-up display device is provided. A mobile device is in communication with a heads-up display (HUD) device. The mobile device is enabled to: transmit a portion of display data to the HUD device for display thereupon, rather than provide the portion to a display of the mobile device; and display a remaining portion of the display data at the display. The HUD device is enabled to: receive from the mobile device the display data for display at the HUD; display the data at the HUD.

12 Claims, 15 Drawing Sheets

(56) References Cited

U.S. PATENT DOCUMENTS

| | | | |
|---|---|---|---|
| 2012/0244907 A1 | 9/2012 | Athsani et al. | |
| 2012/0249797 A1 | 10/2012 | Haddick et al. | |
| 2012/0302289 A1* | 11/2012 | Kang | 455/557 |
| 2013/0127725 A1* | 5/2013 | Sugimoto | 345/168 |

OTHER PUBLICATIONS

Holland Layer Application (Android/IOS) http://www.holland.com/us/tourism/article/holland-layar-app-1.htm Accessed: Oct. 18, 2012 (publication date).

* cited by examiner

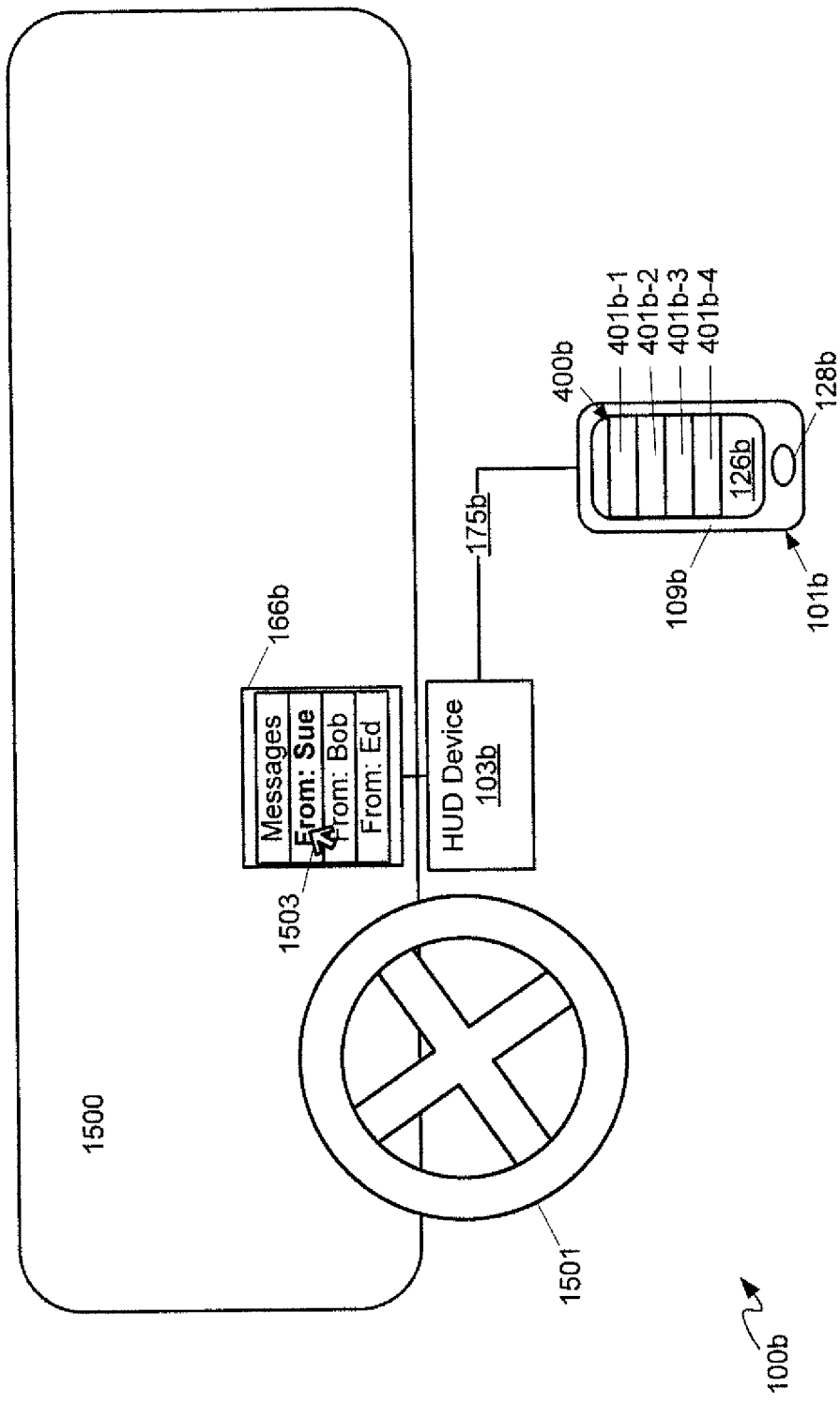

MOBILE DEVICE, SYSTEM AND METHOD FOR CONTROLLING A HEADS-UP DISPLAY

FIELD

The specification relates generally to heads-up displays, and specifically to a mobile device, system and method for controlling a heads-up display.

BACKGROUND

The evolution of computers is currently quite active in the mobile device environment. Further, heads-up displays (HUD) are being integrated into devices, such as glasses and windshields, to provide augmented reality and/or wearable computing environments. However, such heads-up displays can be difficult to control, generally relying on talking, eye tracking, head movements, inputs on sides of wearable HUD devices for such control, all of which are inefficient, and/or awkward.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 15 depicts a schematic perspective diagram of a system including a mobile device for controlling a HUD device incorporated into a windshield of a vehicle, according to non-limiting implementations.

DETAILED DESCRIPTION

Figure 1:
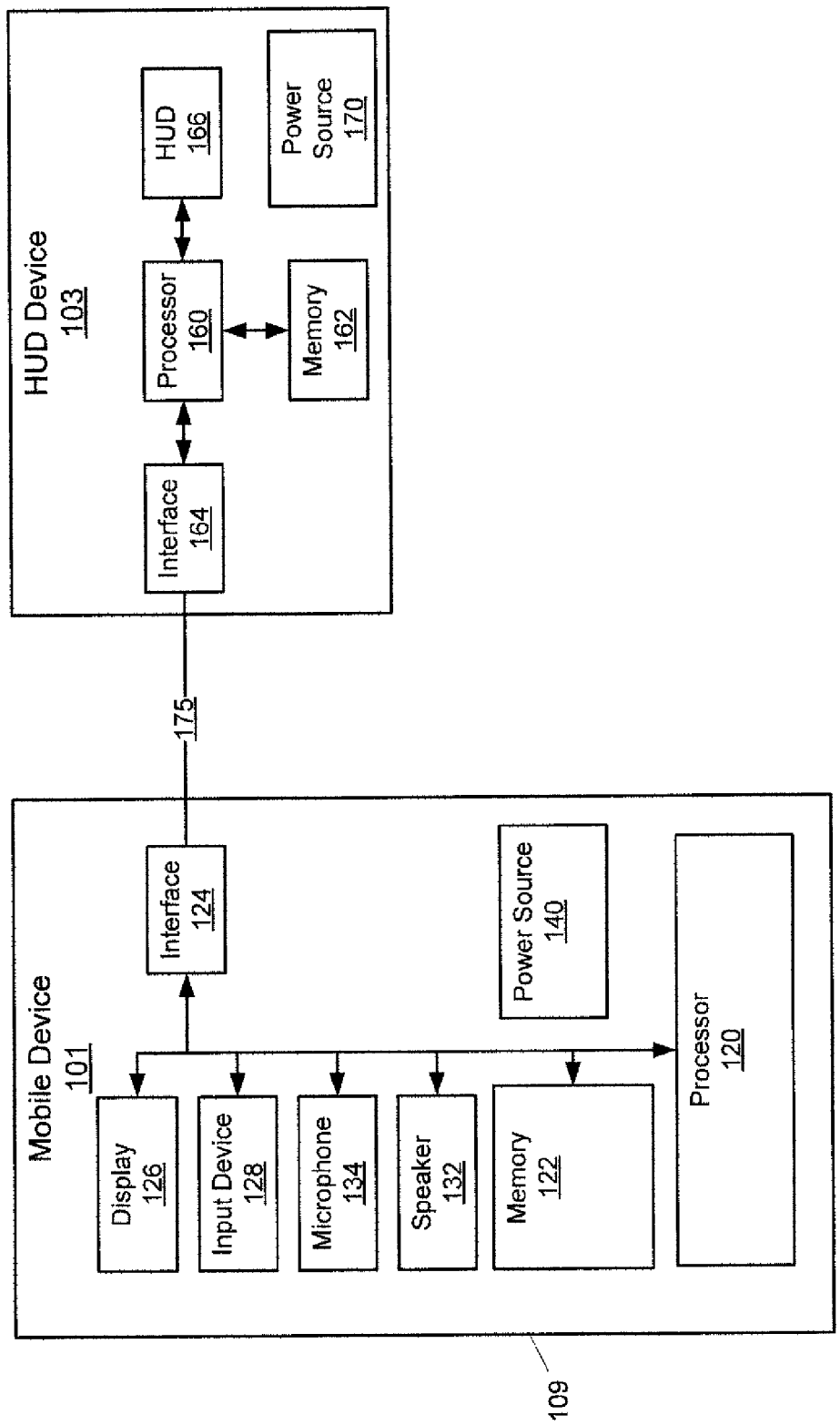
FIG. 1 depicts a schematic block diagram of a system including a mobile device for controlling a heads-up display (HUD) device, according to non-limiting implementations.

In general, this specification is directed to a mobile device for controlling a heads-up display (HUD) device. In general, mobile devices represent electronic devices that are readily movable from place to place. HUD devices can exist in many different formats, ranging from vehicle HUD devices to HUD devices incorporated into flight helmets; further, mobile, wearable HUD devices, in the form of glasses, visors and the like, are becoming more ubiquitous. However, interacting with HUD devices can be challenging: input can be received at wearable HUD devices in a variety of formats, all of which are inefficient, awkward and/or require high computing overhead. For example, some HUD devices can detect speech commands, which requires the HUD device to be configured with a microphone and sophisticated speech-to-text processing capability, and further requires the user to announce to anyone in the immediate vicinity his intended use of the HUD device; needless to say, such verbal commands can be at least socially awkward. Eye tracking solutions lead to eye fatigue in the user, and it can be further difficult to distinguish between an eye movement intended to implement a command and an eye movement unrelated to the HUD device, again leading to intense processing requirements. Similar issues exist with head movement solutions, which further suffer from being socially awkward: in other words, people in a user's vicinity will observe the user of the HUD device making strange movements with their head. Hence, this specification describes various implementations of a mobile device for controlling a HUD device.

In this specification, elements may be described as "enabled to" perform one or more functions or "enabled for" such functions. In general, an element that is enabled to perform or enabled for performing a function is configured to perform the function, or is suitable for performing the function, or is adapted to perform the function, or is operable to perform the function, or is otherwise capable of performing the function.

In addition, some elements are described herein as operating in a master mode and/or a slave mode. In the context of electronics and control apparatus, the "master" and "slave" terminology generally connotes a primary and secondary technological relationship indeed, the words "primary" and "secondary" could generally be substituted for "master" and "slave"—and is not intended to carry any connotation with respect to human slavery. When there are two devices in a master-slave arrangement, the master device act in "master mode"—that is, as master—and the other device acts in slave mode. Generally speaking, a device in master mode can send control signals and/or instructions and/or data to a device in slave mode, or a device in slave mode may perform functions for or on behalf of a master device. Other functionality may also be enabled in a master-slave arrangement, for example: a slave device may be synchronized to a master device; and a master device may have an enhanced status with respect to a slave device—with for example greater privileges, more processing power, more electrical power, more protection, more security or more functionality.

An aspect of the specification provides a mobile device comprising: a processor, a display, an input device, and a communication interface, the processor enabled to: transmit, via the communication interface, a portion of display data to a heads-up display (HUD) device for display thereupon, rather than provide the portion to the display; and, display a remaining portion of the display data at the display.

The portion can comprise a first layer of the display data and the remaining portion can comprise a second layer of the display data. The first layer can comprise one or more of selectable options, content, text, icons, and the second layer can comprise graphical indicators of fields where the one or more of selectable options, content text, icons, would be located if the first layer and the second layer were displayed concurrently.

The processor can be further enabled to: receive input data, via the input device, for updating the portion of the display data displayed at the HUD device; and, in response thereto, transmit, via the communication interface, update data to the HUD device for updating the portion of the display data displayed at the HUD device.

The processor can be further enabled to provide at least one alignment indicator at the display for detection by the HUD device, such that the HUD device can align the portion displayed at the HUD device, with the remaining portion displayed at the display.

Another aspect of the specification provides a method comprising: transmitting, via a communication interface of a mobile device, a portion of the display data to a heads-up display (HUD) device for display thereupon, rather than provide the portion to a display of the mobile device; and, displaying a remaining portion of the display data at the display. The portion can comprise a first layer of the display data and the remaining portion can comprise a second layer of the display data. The first layer can comprise one or more of selectable options, content text, icons, and the second layer can comprise graphical indicators of fields where the one or more of selectable options, content text, icons, would be located if the first layer and the second layer were displayed concurrently.

The method can further comprise: receiving input data, via an input device of the mobile device, for updating the portion of the display data displayed at the HUD device; and, in response thereto, transmitting, via the communication interface, update data to the HUD device for updating the portion of the display data displayed at the HUD device.

The method can further comprise providing at least one alignment indicator at the display for detection by the HUD device, such that the HUD device can align the portion displayed at the HUD device, with the remaining portion displayed at the display.

A further aspect of the specification provides a computer program product, comprising a computer usable medium having a computer readable program code adapted to be executed to implement a method for: transmitting, via a communication interface of the mobile device, a portion of display data to a heads-up display (HUD) device for display thereupon, rather than provide the portion to the display; and displaying a remaining portion of the display data at the display. The computer usable medium can comprise a non-transitory computer usable medium.

Yet a further aspect of the specification provides a he ads-up display (HUD) device comprising: a processor, a HUD, and a communication interface, the processor enabled to: receive from a mobile device, via the communication interface, data for display at the HUD that would otherwise be displayed at the mobile device; and, display the data at the HUD, such that the HUD is controlled by the mobile device, and the data is displayed at the HUD rather than the mobile device.

The processor can be further enabled to: receive from the mobile device, via the communication interface, update data for updating the HUD; and, update the HUD via the update data.

The HUD device can further comprise a detection apparatus for detecting a display of the mobile device, the processor further enabled to: determine, via the detection apparatus, a position of the display of the mobile device; and align the data displayed at the HUD with the display of the mobile device. The processor can be further enabled to: display the data at the HUD in a virtual plane that is aligned with a physical plane of the mobile device. The processor can be further enabled to determine the position of display of the mobile device by detecting, via the detection apparatus, one or more of a shape of the display and at least one alignment indicator provided at the display.

The HUD device can further comprise wearable glasses.

The HUD device can further comprise a vehicular windshield.

A further aspect of the specification provides a method comprising: receiving from a mobile device, at a communication interface of a heads-up display (HUD) device, data for display at a HUD of the HUD device, that would otherwise be displayed at the mobile device; and, display the data at the HUD, such that the HUD is controlled by the mobile device, and the data is displayed at the HUD rather than the mobile device.

The method can further comprise: receiving, via the communication interface from the mobile device, update data for updating the HUD; and, updating the HUD via the update data.

The method can further comprise: determining, via a detection apparatus for detecting a display of the mobile device, a position of the display of the mobile device; and, aligning the data displayed at the HUD with the display of the mobile device.

A further aspect of the specification provides a computer program product, comprising a computer usable medium having a computer readable program code adapted to be executed to implement a method for: receiving from a mobile device, at a communication interface of a heads-up display (HUD) device, data for display at a HUD of the HUD device, that would otherwise be displayed at the mobile device; and, display the data at the HUD, such that the HUD is controlled by the mobile device, and the data is displayed at the HUD rather than the mobile device. The computer usable medium can comprise a non-transitory computer usable medium.

A further aspect of the specification provides a system comprising: a mobile device in communication with a heads-up display (HUD) device, the mobile device enabled to: transmit a portion of display data to the HUD device for display thereupon, rather than provide the portion to a display of the mobile device; and display a remaining portion of the display data at the display, and, the HUD device enabled to: receive from the mobile device the display data for display at a HUD of the HUD device; display the data at the HUD.

FIG. 1 depicts a system 100 comprising a mobile device 101 and a heads-up display (HUD) device 103 for controlling mobile device 101, according to non-limiting implementations. Mobile device 101 comprises a housing 109, which houses a processor 120 interconnected with a memory 122, a communications interface 124, a display 126, an input device 128, a speaker 132, and a microphone 134. Communications interface 124 will be interchangeably referred to as interface 124. Mobile device 101 further comprises a power source 140. HUD device 103 comprises a processor 160 interconnected with a memory 162, a communications interface 164, and a HUD 166. Communications interface 164 will be interchangeably referred to as interface 164. HUD device 103 further comprises a power source 170.

In general, processor 120 of mobile device 101 is enabled to: transmit, via interface 124, a portion of display data to HUD device 103 for display thereupon, rather than provide the portion to display 126; and, display a remaining portion of the display data at display 126. Furthermore, the portion of the display data that is transmitted to HUD device 103 is one or more of not displayed at display 126 and suppressed from being displayed at display 126. Hence, content originally intended for display at mobile device 101, is displayed at HUD device 103. It is appreciated that the portion of the display data can include, but is not limited to, instructions for rendering data at HUD device 103. It is further appreciated that, in some implementations, the portion of display data can exclude a stream of data, such as a video stream; rather the portion of the display data can include, but is not limited to, discrete packets of data for rendering a given set of data at HUD device 166, for example content of a single screenshot that would have otherwise been rendered at display 126 and/or updates to such content, as will be described below.

Hence, processor 160 of HUD device 103 is enabled to: receive from mobile device 101, via interface 164, data for display at HUD 166 that would otherwise be displayed at mobile device 101; and, display the data at HUD 166. Hence, HUD 166 is generally controlled by mobile device, and the data is displayed at HUD 166 rather than mobile device 101.

Further, as will be described in detail below, interactions with mobile device 101 can still occur even though the content originally intended to be displayed at mobile device 101 is displayed at HUD device 103; such interactions are reflected at HUD device 103 by updating the content displayed at HUD device 103.

In other words, similar graphical user interfaces (GUIs) can be provided at both display 126 and HUD 166, but at HUD 166 content that would normally be provided at display 126 is displayed, including, but not limited to, selectable options, content, text, icons, and the like, and at display 126 remaining content is displayed including, but not limited to, graphical indicators of fields where the content would be located if the content and fields and content were displayed concurrently, as will presently be described.

It is further appreciated that communications between mobile device 101 and HID device 103 occur via link 175, which comprises any suitable link for enabling mobile device 101 and HUD device 103 to communicate. Link 175 can hence each include any suitable combination of wired and/or wireless links, wired and/or wireless devices and/or wired and/or wireless networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth™ links, Zigbee™ links, NFC (near field communication) links, WiFi links, WiMax links, packet based links, the Internet, analog networks, the PSTN (public switched telephone network), access points, and the like, and/or a combination. However, in particular non-limiting implementations, link 175 comprises a local link such that mobile device 101 and HUD device 103 can communicate when in proximity with each other.

It is appreciated that FIG. 1 further depicts schematic block diagrams of each of mobile device 101 and HUD device 103, which will be hereafter be described in further detail.

It should be emphasized that the structures of mobile device 101 and HUD device 103 in FIG. 1 are purely examples. For example, as depicted in FIG. 1, it is contemplated that mobile device 101 comprises a device that can be used for implementing both wireless voice (e.g. telephony) and wireless data communications (e.g. email, web browsing, text, and the like), as well as any other specialized functions, including, but not limited, to one or more of, computing, and/or entertainment related functions. Similarly, as depicted in FIG. 1, it is contemplated that HUD device 103 includes HUD 166, and is enabled to communicate with mobile device 101; further HUD device 103 can be wearable, and can include glasses and the like and/or incorporated into a larger device, such as a car windshield. Further, in some implementations, HUD device 103 can be used independent of mobile device 101. However, in other implementations, HUD device 103 can be in a slave mode with mobile device 101, when mobile device is in a master mode.

Mobile device 101 can be any type of electronic device that can be used in a self-contained manner to process applications, including but not limited to, personal information manager (PIM) applications, messaging applications, notification applications and the like. Mobile device 101 includes, but is not limited to, any suitable combination of mobile electronic devices, mobile communications devices, mobile computing devices, portable electronic devices, portable computing devices, portable computing devices, tablet computing devices, telephones, PDAs (personal digital assistants), cell-phones, smartphones, e-readers, internet-enabled appliances and the like. It is further appreciated that some mobile devices may be handheld, that is, sized and shaped to be held and carried in as human hand, and used while held or carried. Other suitable devices are within the scope of present implementations.

Mobile device 101 comprises at least one input device 128 generally enabled to receive input data, and can comprise any suitable combination of input devices, including but not limited to a keyboard, a keypad, a pointing device, a mouse, a track wheel, a trackball, a touchpad, a touch screen and the like. Other input devices are within the scope of present implementations.

Input from input device 128 is received at processor 120 (which can be implemented as a plurality of processors, including but not limited to one or more central processors (CPUs). Processor 120 is configured to communicate with a memory 122 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of mobile device 101 as described herein are typically maintained, persistently, in memory 122 and used by processor 120 which makes appropriate utilization of volatile storage during the execution of such programming instructions. In some implementations, processor 120 comprises at least a portion of memory 122, for example as on-board random access memory (RAM). It is further appreciated that memory 122 is an example of computer readable media that can store programming instructions executable on processor 120. Furthermore, memory 122 is also an example of a memory unit and/or memory module.

Processor 120 can be further configured to communicate with display 126, microphone 134 and speaker 132. Display 126 comprises any suitable one of, or combination of, CRT (cathode ray tube) and/or flat panel displays (e.g. LCD (liquid crystal display), high definition displays, plasma, OLED (organic light emitting diode), capacitive or resistive touch screens, and the like). Further, in some implementations, mobile device 101 can be further enabled to communicate with an external display device, for example via an optional interface and/or connector (not depicted), including, but not limited to, a High-Definition Multimedia Interface (HDMI) and/or connector. Microphone 134 comprises a microphone for receiving sound and converting to sound data at mobile device 101. Speaker 132 comprises a speaker for providing sound from sound data, audible alerts, audible communications from remote communication devices, and the like, at mobile device 101.

Processor 120 also connects to interface 124, which is implemented as one or more radios and/or connectors and/or network adaptors, configured to wirelessly communicate with one or more communication networks (not depicted). It will be appreciated that, in these implementations, interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 20, 2.50, 30, 40+, UMTS (Universal Mobile Telecommunications System), CDMA (Code division multiple access), WCDMA (Wideband CDMA), FDD (frequency division duplexing), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WiFi links, WiMax links, packet based links, the Internet, analog networks, the PSTN (public switched telephone network), access points, and the like, and/or a combination. When interface 124 is configured to communicate with one or more communication networks, interface 124 can comprise further protocol specific antennas therefor (not depicted).

However, in particular, interface 124 is generally enabled to communicate with HUD device 103 via link 175, for example via a local communication protocol suitable for conveying display data including, but not limited to WiFi, Near Field Communication (NFC) Bluetooth™, Zigbee™, and the like, though communication between mobile device 101 and HUD device 103 can be wired and/or wireless as desired. Further, it will be appreciated that interface 124 are configured to correspond with network architecture that is used to implement interface 164, and vice versa, as described below.

Housing 109 can comprise any housing, casing, and the like, enabled to be at least one of held and carried by a human hand. In general, housing 109 houses the components of mobile device 101; however some components can be visible via apertures, windows and the like in housing 109, for example visual indicators (not depicted) and display 126 are exposed.

Mobile device 101 further comprises power source 140, including but not limited to a battery and/or a power pack, or any other suitable power source.

In any event, it should be understood that a wide variety of configurations for mobile device 101 are contemplated.

Turning now to HUD device 103, as depicted in FIG. 1, processor 160 is generally interconnected with interface 164 and HUD 166.

Processor 160 can be implemented as a plurality of processors, including but not limited to one or more central processors (CPUs), microcontrollers and the like. Processor 160 is configured to communicate with a memory 162 comprising a non-volatile storage unit (e.g. Erasable Electronic Programmable Read Only Memory ("EEPROM"), Flash Memory, and the like) and a volatile storage unit (e.g. random access memory ("RAM"), and the like). Programming instructions that implement the functional teachings of mobile device 101 as described herein are typically maintained, persistently, in memory 162 and used by processor 160 which makes appropriate utilization of volatile storage during the execution of such programming instructions. In some implementations, processor 160 comprises at least a portion of memory 162, for example as on-board random access memory (RAM). It is further appreciated that memory 162 is an example of computer readable media that can store programming instructions executable on processor 160. Furthermore, memory 162 is also an example of a memory unit and/or memory module.

Processor 160 further connects to interface 164 which can be similar to interface 124; hence, interface 164 can optionally communicate with communication networks (e.g. as described above with respect to interface 124), for example to download content, which can be displayed at HUD 166 independent of mobile device 101.

However, interface 164 is generally enabled to communicate with mobile device 101 via link 175, for example via a local communication protocol suitable for conveying display data including, but not limited to WiFi, Near Field Communication (NFC) Bluetooth™, Zigbee™, and the like, though communication between mobile device 101 and HUD device 103 can be wired and/or wireless as desired. Further, it will be appreciated that interface 164 is configured to correspond with network architecture that is used to implement interface 124.

HUD 166 can comprise any type of heads-up display including, but not limited to, any suitable one of, or combination of, projection displays, CRT (cathode ray tube), flat panel displays, LCD (liquid crystal display), high definition displays, plasma, OLED (organic light emitting diode), transparent displays, and the like.

HUD device 103 further comprises power source 170, including but not limited to a battery and/or a power pack, or any other suitable power source.

While not depicted, HUD device 103 can further comprise an input device for receiving commands, for example, including, but not limited to, any combination of buttons, eye tracking devices, head tracking devices, microphones, speech recognition devices, and the like. However, such input devices are not needed for present implementations, when HUD device 103 is used in a slave mode with mobile device 101 used in a master mode, and indeed, present implementations are intended to overcome certain limitations of such input devices, when present.

Figure 2:
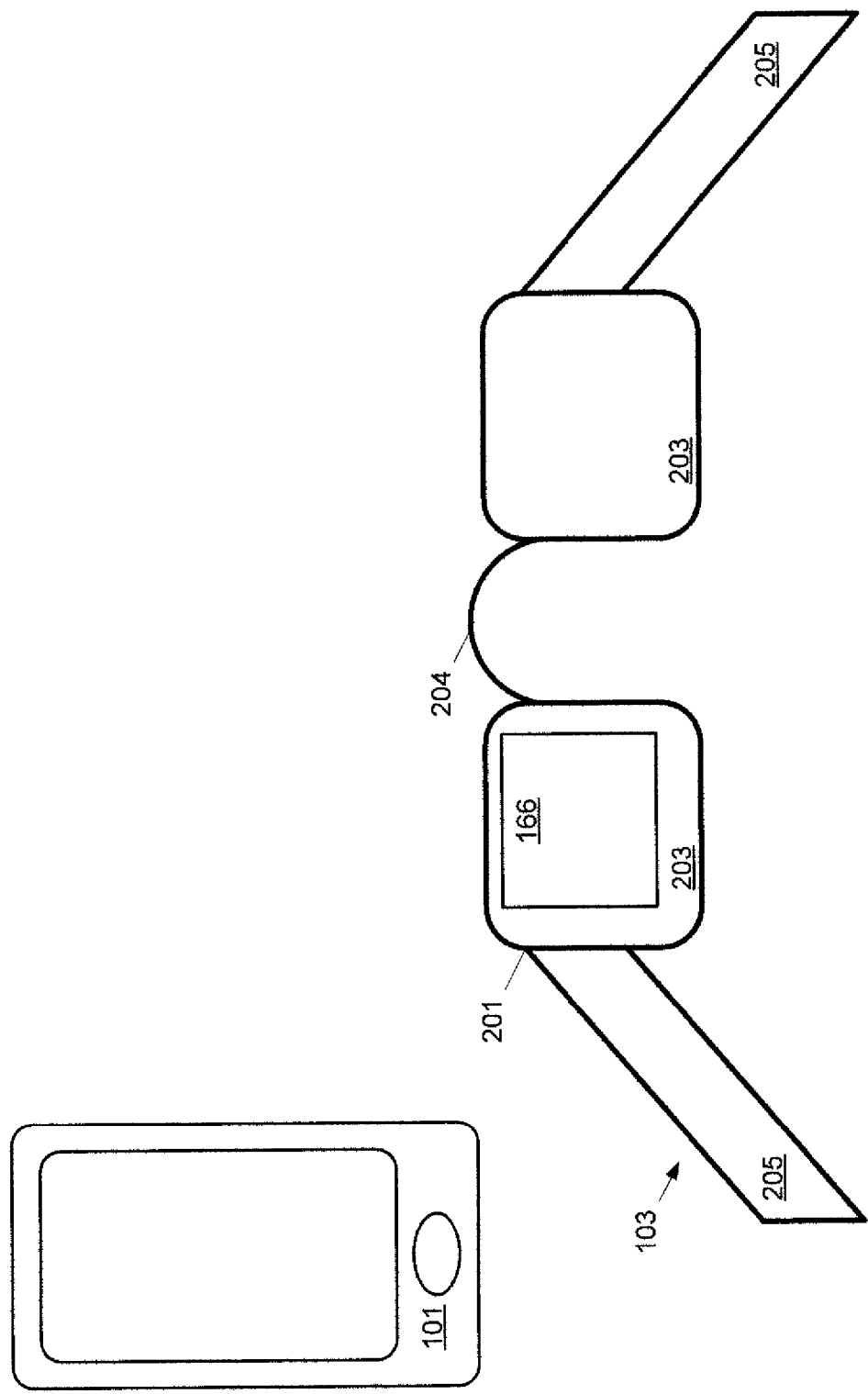
FIG. 2 depicts a particular non-limiting perspective view of example implementations of the system of FIG. 1 where mobile device comprises a mobile communication device, such as a smartphone, and the like, and HUD device comprises wearable glasses.

Attention is next directed to FIG. 2, which depicts a particular non-limiting perspective view of example implementations of system 100 where mobile device 101 comprises a mobile communication device, such as a smartphone, and the like, and HUD device 103 comprises wearable glasses. "Wearable" is appreciated to mean wearable by a person/human being. Further, the term "wearable" is meant to convey that HUD 166 is viewable by one or more eyes of a human being when HUD device 103 is being worn. Further, the term "glasses" is not to be construed so narrowly as to include only devices having the form factor and/or functionality of corrective glasses and/or sunglasses. For example the HUD device 103 need not have either vision correction functionality and/or sunglasses functionality, though, in some implementations, the wearable glasses can have one or more of vision correction functionality and sunglasses functionality. Further, HUD device 103 need not have two lenses, a nose piece and ear pieces as with corrective glasses; rather, in these implementations, HUD device 103 can comprise glasses, a visor, a helmet, a headpiece, and the like, as long as HUD 166 is viewable by a user when HUD device 103 is worn by a user.

In any event, in these display comprises a frame 201, lenses 203, a nosepiece 204 there between, and earpieces 205. It is further appreciated that while two lenses 203 are depicted, one for each of a left eye and right eye, in other in implementations HUD device 103 comprises only one lens 203 (i.e. one lens 203 for one of a left eye or a right eye, or one wraparound lens/visor for both eyes). Further, in these implementations, one lens 203 comprises HUD 166 such that HUD 166 is viewable by one eye; for example, in these implementations, HUD 166 can comprise a semi-transparent display integrated into one of lenses 203. However, in other implementations, each lens 203 can comprise a respective HUD 166, for example to produce a stereo effect. In yet further implementations, HUD 166 need not be built into a lens 203 but can be located in front of one or more of lenses 203 and/or be enabled to be moveable in front of lens 203 such that HUD 166 is viewable when HUD device 103 is worn by a user.

Further, while not depicted, it is appreciated that processor 160, interface 164 and power source 170 are integrated into, for example, one or more of frame 201, nosepiece 204, and earpieces 205.

In any event, it should be understood that a wide variety of configurations for HUD device 103 are contemplated.

Figure 3:
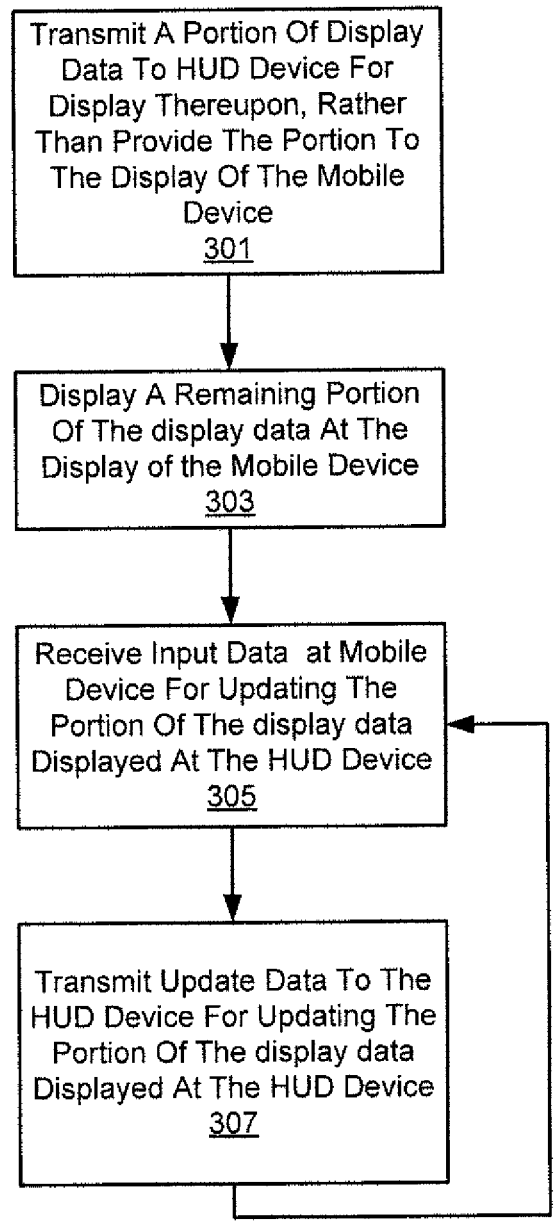
FIG. 3 depicts a flowchart of a method for controlling a HUD device, according to non-limiting implementations.

Attention is now directed to FIG. 3 which depicts a flowchart of a method 300 for controlling a HUD device, according to non-limiting implementations. In order to assist in the explanation of method 300, it will be assumed that method 300 is performed using system 100. Furthermore, the following discussion of method 300 will lead to a further understanding of system 100 and its various components. However, it is to be understood that system 100 and/or method 300 can be varied, and need not work exactly as discussed herein in conjunction with each other, and that such variations are within the scope of present implementations.

It is appreciated that, in some implementations, method 300 is implemented in system 100 by processor 120 of mobile device 101. Indeed, method 300 is one way in which mobile device 101 can be configured. It is to be emphasized, however, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of system 100 as well.

It is further appreciated that it is assumed in the following discussion that communication between mobile device 101 and HUD device 103 has been previously established via link 175.

At block 301, processor 120 transmits, via communication interface 124, a portion of display data to HUD device 103 for display thereupon, rather than provide the portion to display 126.

At block 303, processor 120 displays a remaining portion of the display data at display 126.

At block 305, processor 120 receives receive input data, via input device 128, for updating the portion of the display data displayed at HUD device 103. In other words, the input data is received at mobile device 101 and not HUD device 103.

At block 307, in response to block 305, processor 120 transmits, via communication interface 124, update data to HUD device 103 for updating the portion of the display data displayed at HUD device 103. Blocks 305 to 307 can be repeated indefinitely until one or more of communications between mobile device 101 and HUD device 103 are severed (i.e. link 175 is severed) and input data to exit method 300 is received, for example at an input device of one or more of mobile device 101 and HUD device 103.

Figure 4:
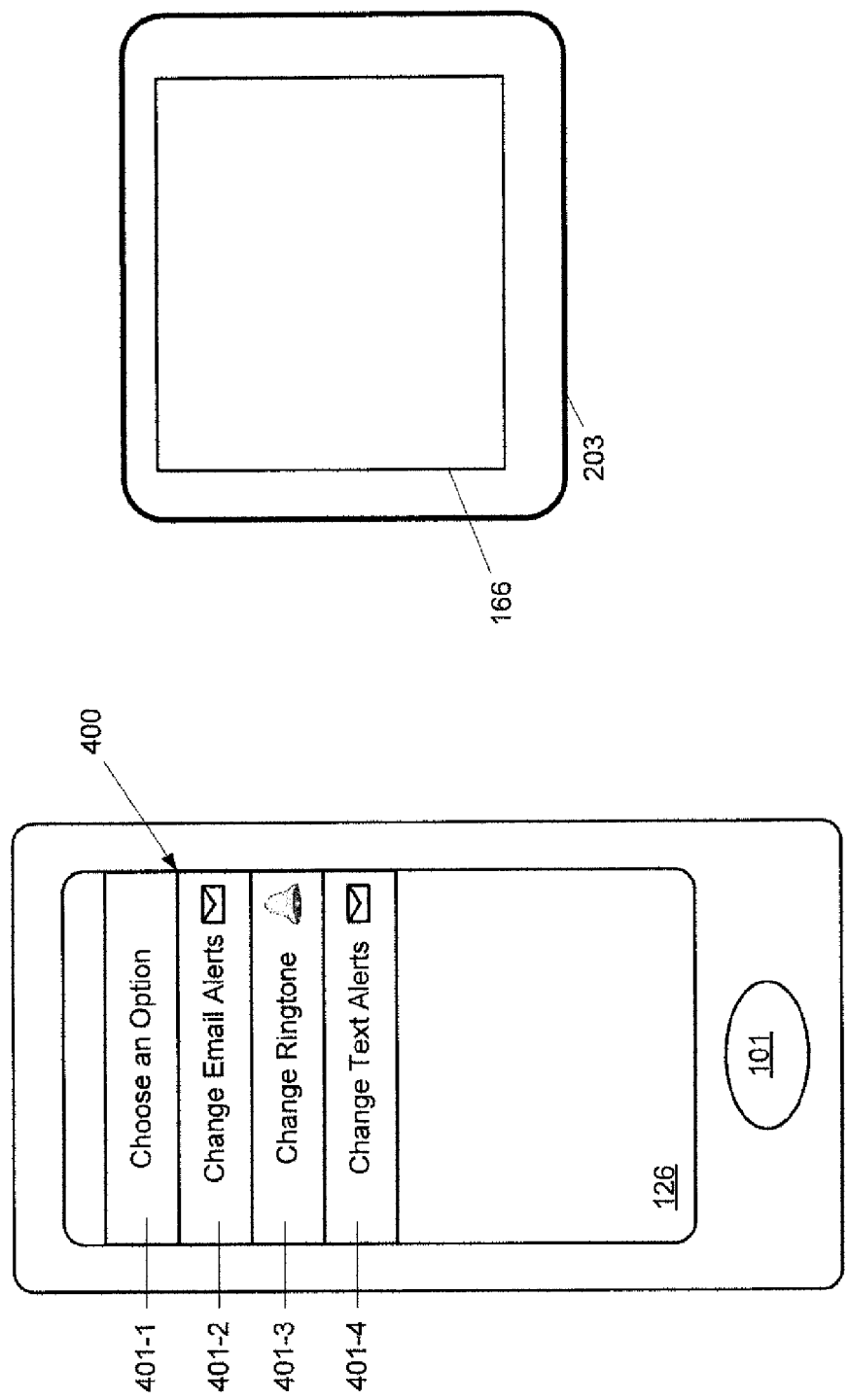
FIG. 4 depicts the mobile device 101 and the HUD device of FIG. 2 prior to either one or more of a link being established therebetween and the method of FIG. 3 being implemented, according to non-limiting implementations.
Figure 5:
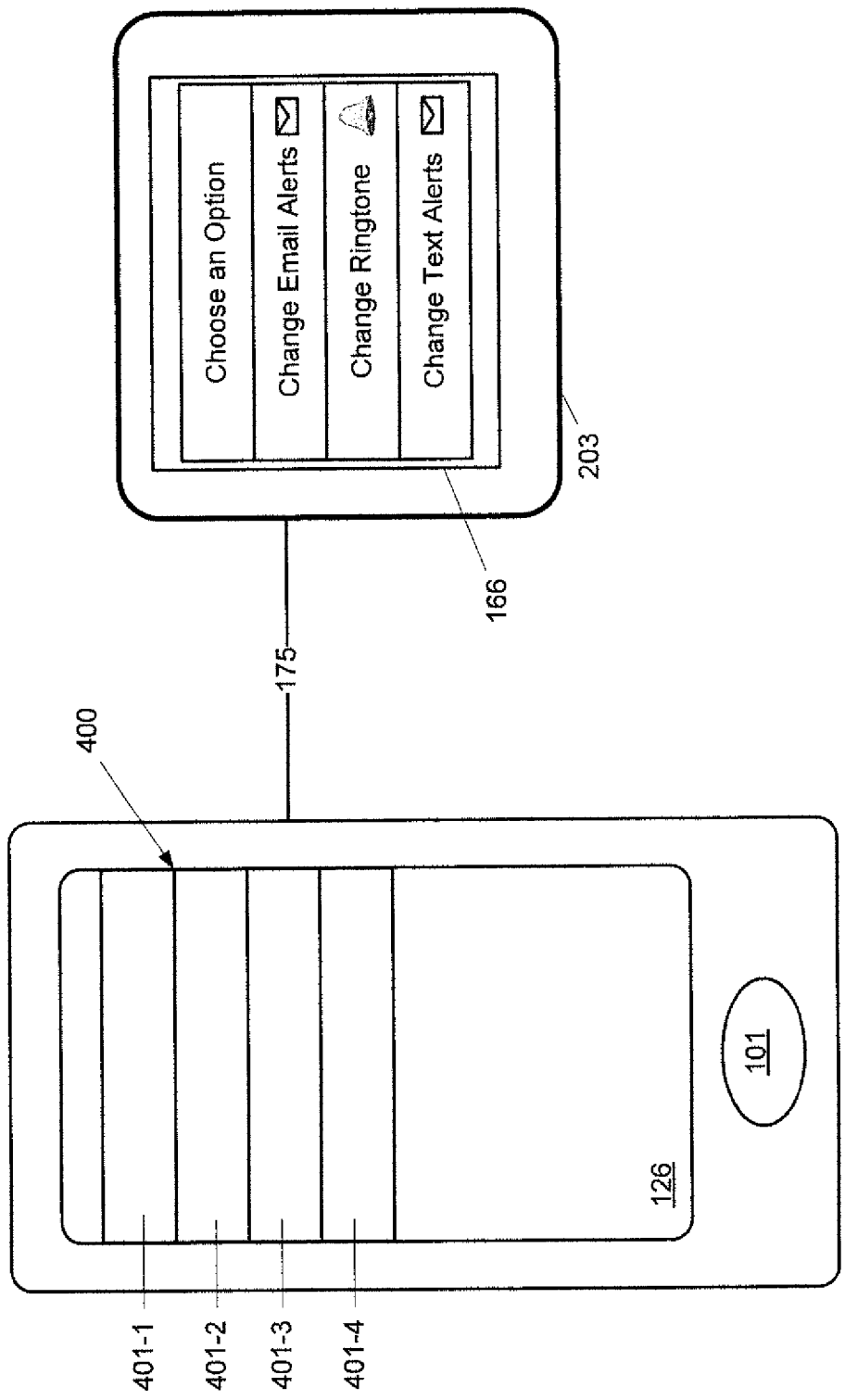
FIG. 5 depicts the mobile device and the HUD device of FIG. 2 after either one or more of a link being established therebetween and the method of FIG. 3 being implemented, according to non-limiting implementations.
Figure 6:
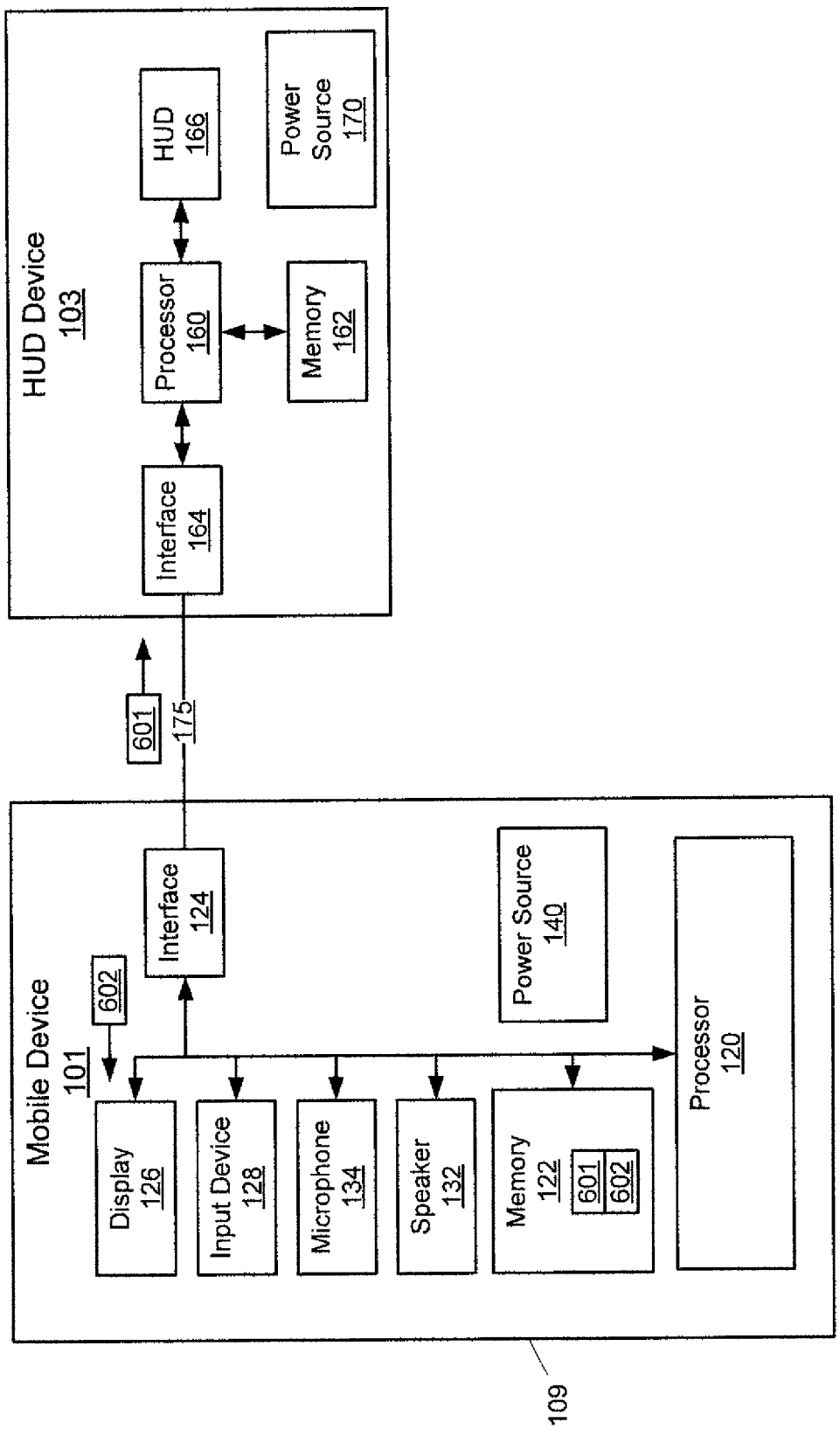
FIG. 6 depicts the system of FIG. 1 when the method of FIG. 3 is being implemented and display data for HUD device is being buffered at a memory of the device, according to non-limiting implementations.
Figure 7:
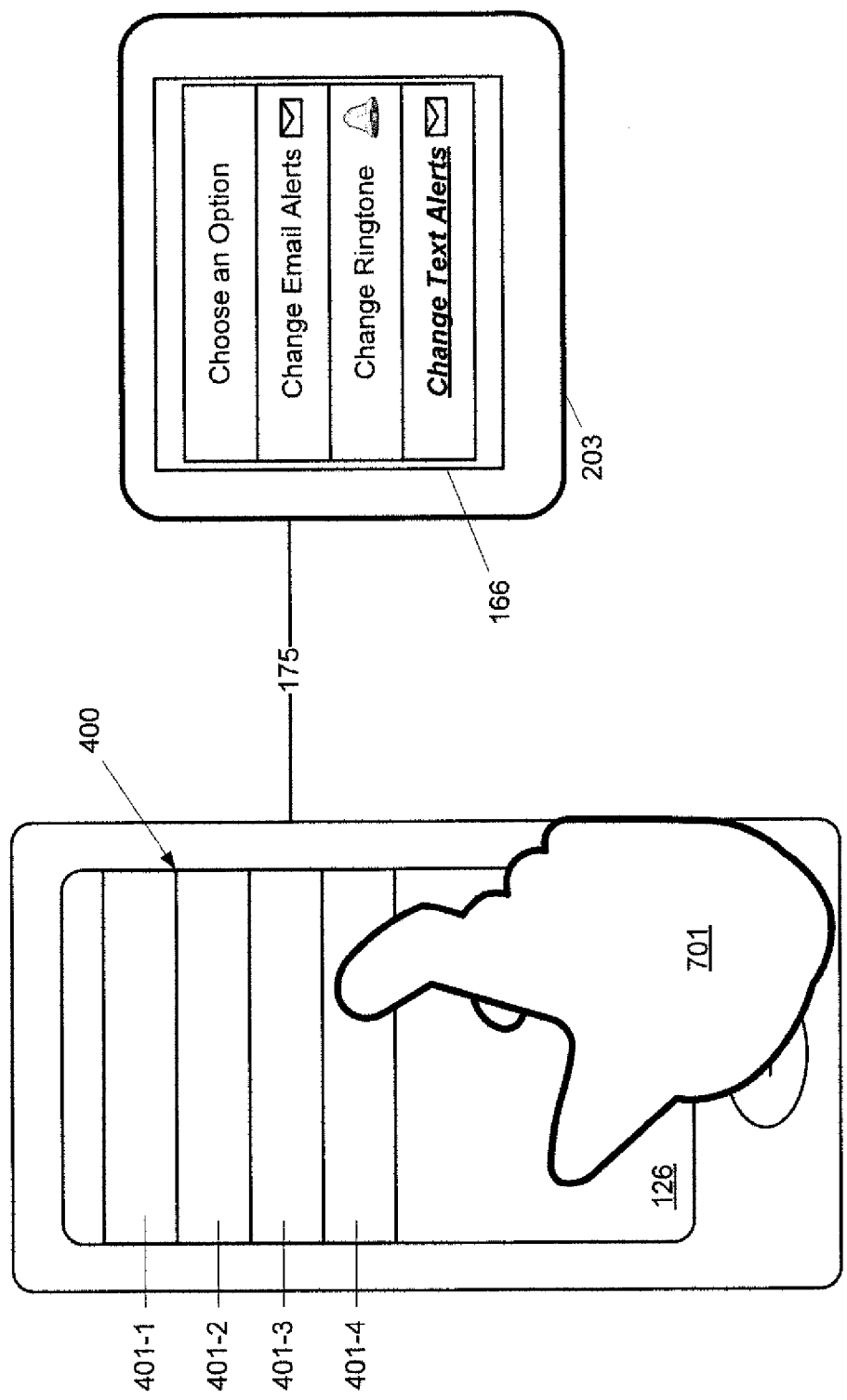
FIG. 7 depicts a hand of a user interacting with the mobile device and the HUD device of FIG. 2 after either one or more of a link being established therebetween and the method of FIG. 3 being implemented, according to non-limiting implementations.
Figure 8:
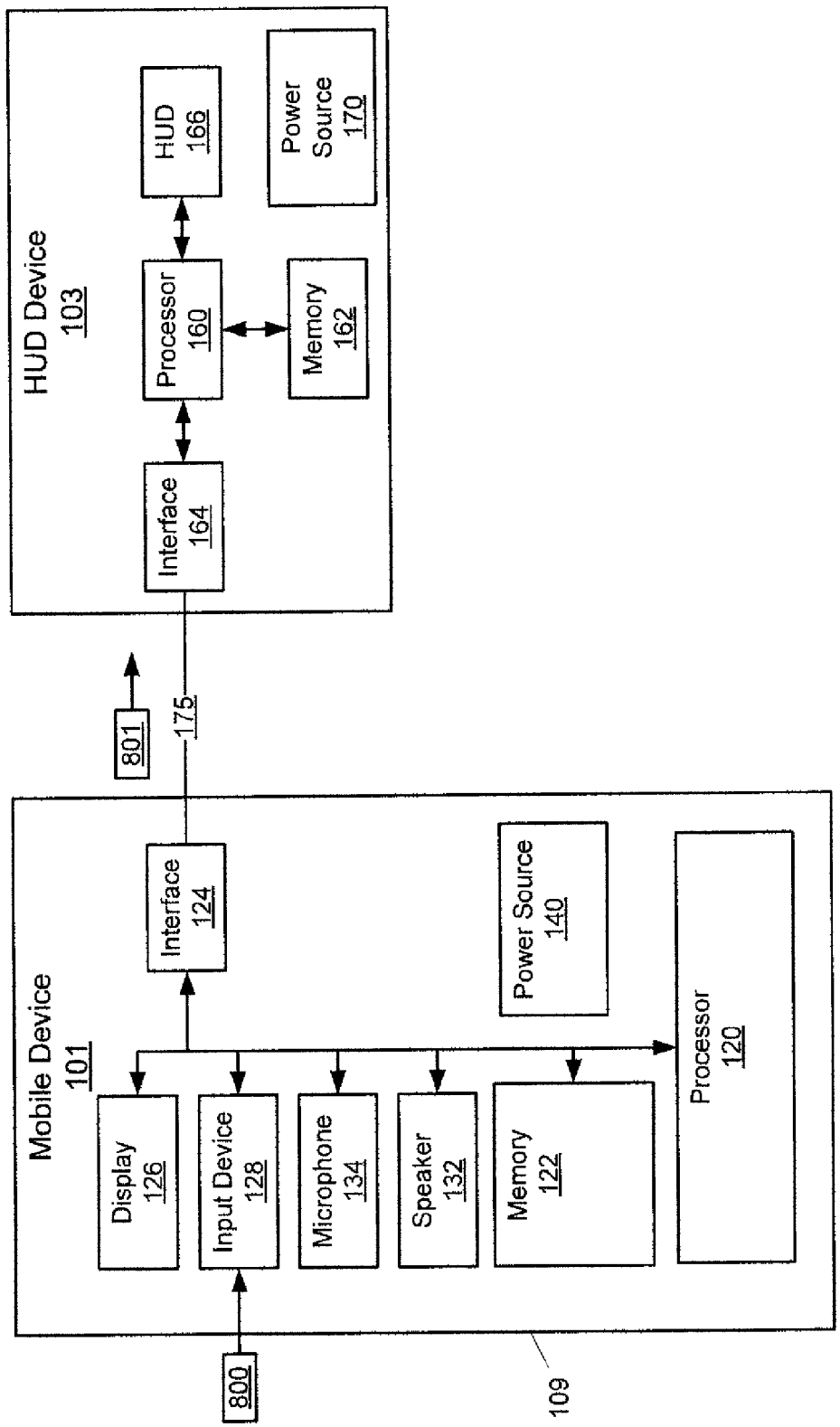
FIG. 8 depicts the system of FIG. 1 when the method of FIG. 3 is being implemented and input data is being received at an input device of the device, according to non-limiting implementations.

Non-limiting examples of method 300 will now be described with reference to FIGS. 4 to 8. Each of FIGS. 4, 5 and 7 depict display 126 of mobile device 101 and HUD 166 in a lens 203 of HUD device 103 of implementations of FIG. 2; while not depicted, it is assumed that the remaining elements of HUD device 103 of FIG. 2 (i.e. frame 201, nose piece 203, earpieces 205) are nonetheless present. Each of FIGS. 6 and 8 are similar to FIG. 1, with like elements having like numbers. It is further assumed in FIGS. 4 to 8 that display 126 and/or input device 128 comprises a touch screen device and that selectable options provided at display 126 can be selected via receipt of touch input data at the touch screen device. However, such implementations are not to be considered unduly limiting and other types input devices are within the scope of present implementations; for example a pointing device could be used to make selections.

In particular, FIG. 4 depicts mobile device 101 and HUD 166 prior to either one or more of link 175 being established and method 300 being implemented. From FIG. 4, it is apparent that a non-limiting example graphic user interface (GUI) 400 is being provided at display 126 with content comprising text, icons, selectable options, located in fields 401-1, 401-2, 401-3, 401-4 (referred to hereafter, collectively, as fields 401, and, generically as a field 401). For example: field 401-1 comprises text comprising "Choose an Option", indicating that one of the selectable options provided in fields 401-2, 401-3, 401-4 are to be selected; field 401-2 comprises text indicating a selectable option for changing an email alert, along with an icon of an envelope; field 401-3 comprises text indicating a selectable option for changing a ringtone, along with an icon of a bell; and, field 401-4 comprises text indicating a selectable option for changing a text alert, along with an icon of an envelope. However, it is appreciated that the specific combination of text, icons and the like of each field 401 is not to be considered particularly limiting, and method 300 can be applied in conjunction with any GUI provided at display 126.

For example, while GUI 400 corresponds to an application for changing notifications at mobile device 101, present implementations are not so limiting and method 300 can be used in conjunction with any application at mobile device 101 where data is displayed at display 126, including, but not limited to, messaging applications, calendar applications, personal information manager (PIM) applications, and the like.

It is further appreciated that, regardless of application, GUI 400 comprises layers of data. For example content of fields 401 can comprise a first layer, and graphical indicators of fields 401 (e.g. the rectangles defining locations of each field 401) can comprise a second layer.

It is further appreciated that, in FIG. 4, HUD 166 is presently blank, however, in other implementations, HUD 166 can be displaying content unrelated to GUI 400, for example, content stored at memory 162 and/or content downloaded from a communication network via interface 164.

In any event, attention is next directed to FIG. 5, where it is assumed that method 300 is being implemented, and link 175 has been established. It is appreciated that while fields 401 are still present at display 126 (block 303), the content of fields 401 is no longer present at display 126. Rather, the content of fields 401 is now provided at HUD 166 (block 301) and not provided at display 126. For example, with reference to FIG. 6, when method 300 is implemented at processor 120, processor 120 can buffer display data 601, 602 intended for display at display 126, for example at memory 122 (and/or at a display buffer memory), with display data 601 comprising the content of fields 401 in a first layer, and display data 602 comprising graphical indicators of fields 401, where the content of fields 401 would be located if the first layer (i.e. display data 601) and the second layer (i.e. display data 602) were displayed concurrently.

However, rather than provide display data 601, 602 concurrently to display 126, at block 301, display data 601 is transmitted to HUD device 103 at block 301, via interface 124 and link 175, and at block 303, display data 602 is provided at display 126. In other words, mobile device 101 is enabled as a master device and HUD device 103 is enabled as a slave device to mobile device 101. Further, in some implementations, display data 602 can comprise a discrete packet of data for rendering content of fields 401; once HUD device 103 has received display data 602, HUD device 103 can render the content at HUD 166 without receiving further data, for example as would occur in data streaming, thereby saving bandwidth on link 175, as well as power at each of power sources 140, 170.

Hence, display data 601 can be viewed at HUD 166, but processor 120 does not provide display data at display 126. Hence, display data 601 can be viewed discretely and/or privately at HUD 166. Thus, when a user of system 100 desires to view data at mobile device 101, for example in a meeting, on public transit, and the like, such viewing can occur discretely view HUD 166 and content, including but not limited to sensitive content, such as email content, text messages, and the like, can be suppressed from display 126 of mobile device 101. Indeed, the notification changes that are depicted in FIG. 4 can also be sensitive information: when a user is performing such changes in a meeting, the user may prefer that the other attendees of the meeting not know that the user is configuring notifications at mobile device 101 and hence can privately do so using present implementations.

In any event, while display 126 no longer provided the content displayed at HUD 166, processor 120 continues to provide fields 401 at display 126 where the same data would have been located, such that interactions with fields 401 can still occur at mobile device 101. Indeed, it is appreciated that relative locations of fields 401 is similar to relative locations of the corresponding data displayed at HUD 166.

For example, attention is next directed to FIG. 7 where a hand 701 of a user is depicted as interacting with field 401-4 to select field 401-3 and input data for updating display data 602 at displayed at HUD device 103 is received. For example, at HUD 166, the text "Change Text Alerts", formerly displayed in field 401-4, is now highlighted and underlined, indicating that this text is selected. As the relative locations of fields 401 and relative locations of display data at HUD 166 are similar, the user appreciates the relative distance to move hand 701 in order to select different fields 401 and/or display data.

With reference to FIG. 8, selection of text "Change Text Alerts" is achieved by processor 120 determining that input data 800 has been received at input device 128 (e.g. at block 305), indicating that field 401-4 has been selected, and transmitting update data 801 to HUD device 103 (e.g. block 307) via interface 124 and link 175, update data 801 for text formerly provided at field 401-4 to selected text.

It is further appreciated that receipt of input data 800 at a field 401 could alternatively cause processor 120 to replace GUI 400 with another GUI, for example a GUI for changing a text alert; however, again, selectable options, content, text, icons would be provided at HUD 166 and graphical indicators of fields where one or more of selectable options, content, text, icons would be located would be provided at HUD 166.

Further, interactions with display data provided at HUD device 103 can be received via input device 128 of mobile device 101 rather than input devices at HUD device 103. It is further appreciated that input data received at mobile device 101 can further comprise commands for updating one or more of mobile device 101 and data at mobile device 101. For example, when system 100 is used to change a text alert, not only is data exchanged between mobile device 101 and HUD device 103 to update display data at HUD 166, but an alert provided at mobile device 101 when a text message is received can be updated.

In other words, system 100 provides a convenient method for discretely interacting with mobile device 101, as well as a convenient method for controlling HUD device 103.

Figure 9:
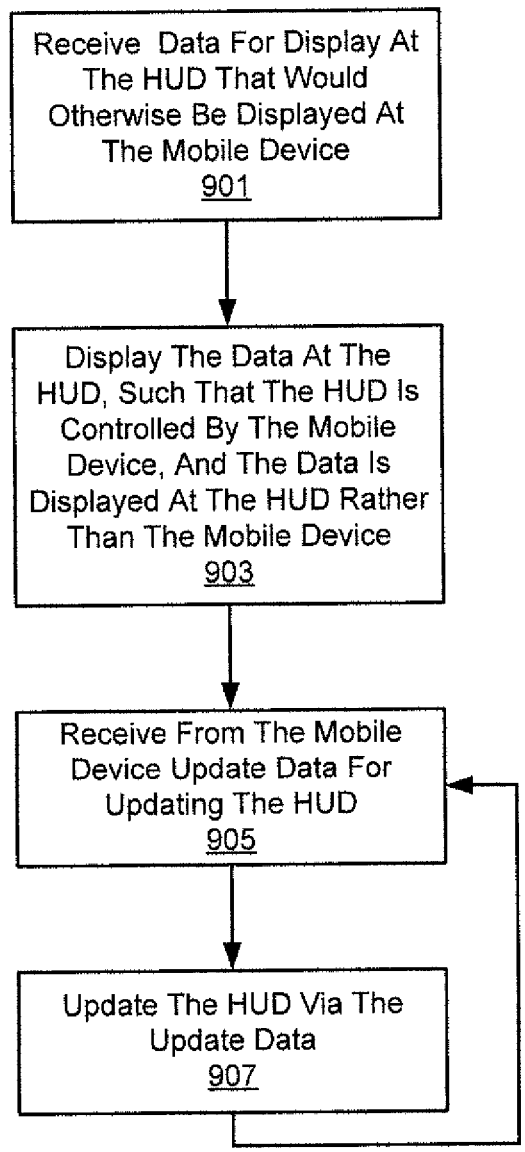
FIG. 9 depicts a flowchart of a method for controlling a HUD device, according to non-limiting implementations.

Attention is now directed to FIG. 9 which depicts a flowchart of a method 900 for controlling a HUD device, according to non-limiting implementations. In order to assist in the explanation of method 900, it will be assumed that method 900 is performed using system 100. Furthermore, the following discussion of method 900 will lead to a further understanding of system 100 and its various components. However, it is to be understood that system 100 and/or method 900 can be varied, and need not work exactly as discussed herein in conjunction with each other, and that such variations are within the scope of present implementations.

It is appreciated that, in some implementations, method 900 is implemented in system 100 by processor 160 of HUD device 103. Indeed, method 900 is one way in which HUD device 103 can be configured. It is to be emphasized, however, that method 900 need not be performed in the exact sequence as shown, unless otherwise indicated; and likewise various blocks may be performed in parallel rather than in sequence; hence the elements of method 900 are referred to herein as "blocks" rather than "steps". It is also to be understood, however, that method 900 can be implemented on variations of system 100 as well.

It is further appreciated that it is assumed in the following discussion that communication between mobile device 101 and HUD device 103 has been previously established via link 175.

It is yet further appreciated that method 900 is implemented concurrently with method 300 and indeed, one or more blocks of method 900 can be implemented in response to implementation of one or more blocks of method 300.

At block 901, processor 160 receives, from mobile device 101, via interface 164, data for display at HUD 166 that would otherwise be displayed at mobile device 101. For example, such data corresponds to display data 602 described above, and hence block 901 occurs in response to block 301 of method 300 where display data 602 is transmitted as described above.

At block 903, processor 160 displays the data at HUD 166, such that HUD 166 is controlled by mobile device 101, and the data is displayed at HUD 166 rather than mobile device 101, for example as depicted in FIG. 5, described above.

At block 905, processor 160 receives from mobile device 101, via interface 124, update data for updating HUD 166, for example update data 801 as described above with reference to FIG. 8. Hence, block 905 occurs in response to block 307 of method 300.

At block 907, processor 160 updates HUD 166 via the update data, for example as depicted in FIG. 7, described above.

Hence, HUD device 103 is generally controlled by mobile device 101.

Persons skilled in the art will appreciate that there are yet more alternative implementations and modifications possible.

Figure 10:
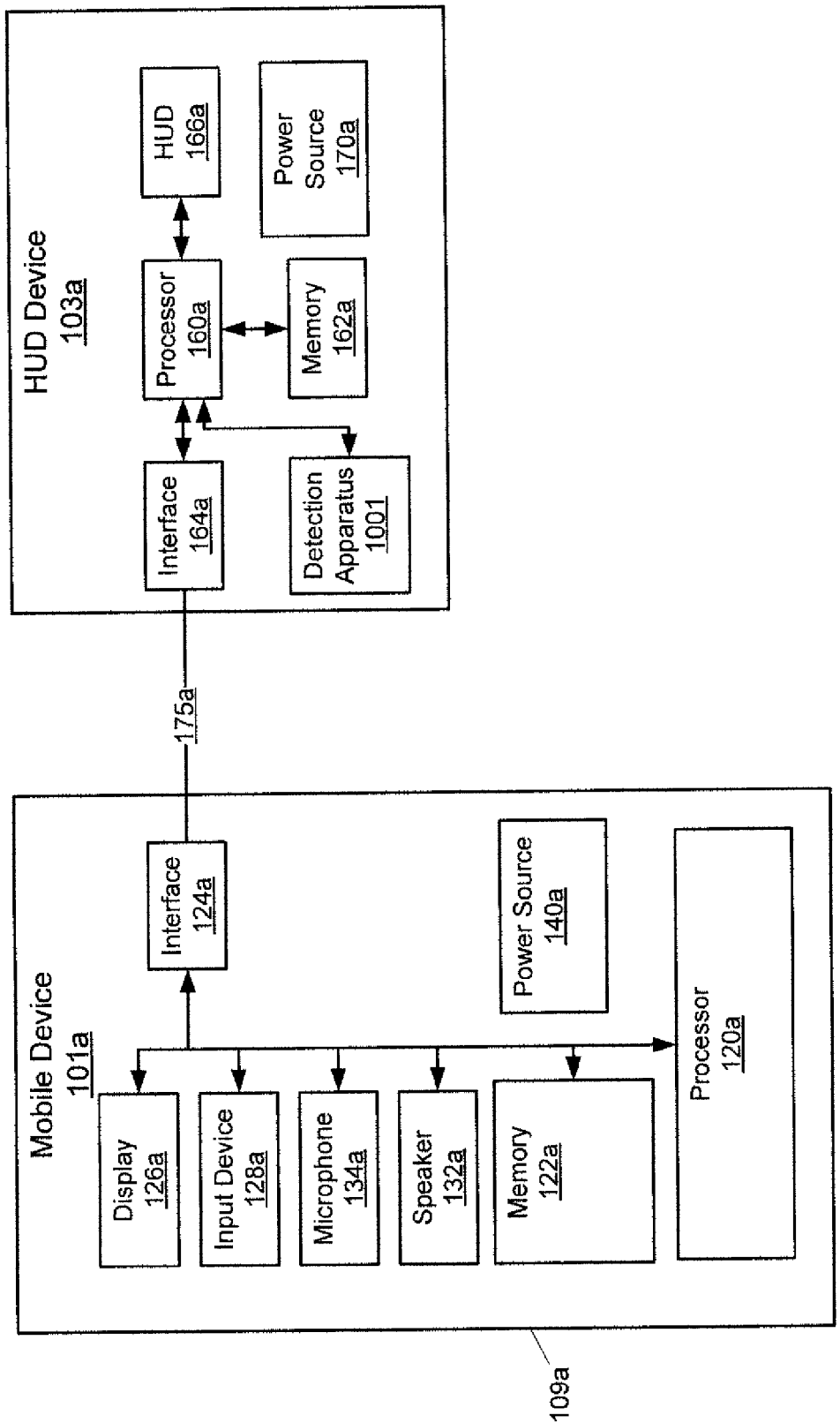
FIG. 10 depicts a schematic block diagram of a system including a mobile device for controlling a heads-up display (HUD) device, the HUD device including a detection apparatus, according to non-limiting implementations.

For example, attention is next directed to FIG. 10 which depicts a system 100a that is substantially similar to FIG. 1, with like numbers, but with an "a" appended thereto. Hence, system 100a comprises a mobile device 101a and a heads-up display (HUD) device 103a for controlling mobile device 101a, according to non-limiting implementations. Mobile device 101a comprises a housing 109a, a processor 120a, a memory 122a, a communications interface 124a, a display 126a, an input device 128a, a speaker 132a, a microphone 134a, and a power source 140a. Communications interface 124a will be interchangeably referred to as interface 124a. HUD device 103a comprises a processor 160a, a memory 162a, a communications interface 164a, a HUD 166a and a power source 170a. Communications interface 164a will be interchangeably referred to as interface 164a. Mobile device 101a and HUD device 103a are in communication via a link 175a. However, in these implementations, HUD device 103a further comprises a detection apparatus 1001 interconnected with processor 160a; detection apparatus 1001 can include, but is not limited to a digital camera, a charge coupled device (CCD) and the like.

Figure 11:
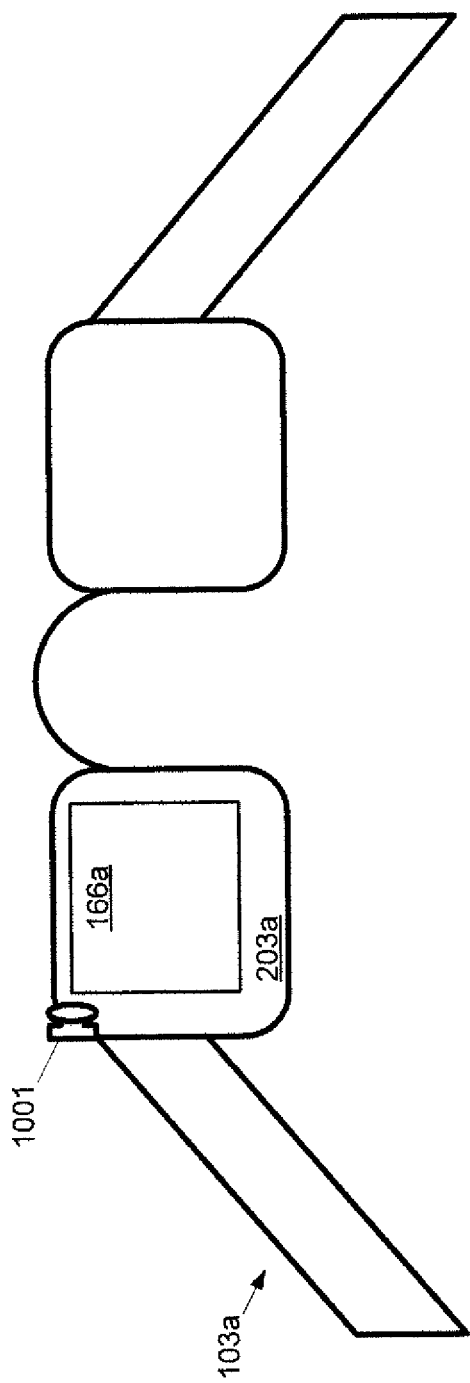
FIG. 11 depicts a perspective view of the HUD device of FIG. 10, the detection apparatus mounted on and/or incorporated into a frame of the HUD device, according to non-limiting implementations.

Specifically detection apparatus 1001 can be enabled to detect display 126a. For example, detection apparatus 1001 can be enabled to acquire images of a field of view in front of HUD device 103. Hence, as depicted in FIG. 11, which depicts a perspective view of HUD device 103a, detection apparatus 1001 can be one of mounted on and/or incorporated into a frame of HUD device 103a such that images can be acquired of a field of view in front of at least HUD 166a and/or lens 203a where HUD 166a is positioned.

In any event, images acquired by detection apparatus 1001 can be processed by processor 160a, which can in turn be enabled to determine, via detection apparatus 1001, a position of display 126a of mobile device 101a; and align the data displayed at HUD 166a with display 126a of mobile device 101a.

For example, processor 120a can be enabled to determine whether display 126a is located in the acquired images and further determine a position of display 126a in the acquired images. In some implementations, processor 160a can be enabled to determine a shape of display 126a, for example by determining whether a rectangle having an aspect ratio similar to an aspect ratio of display 126a is located in the acquired images, and further determine a location of the rectangle in the images. Alternatively, an image of mobile device 101a and/or display 126a can be stored in memory 162a and compared to acquired images.

Figure 12:
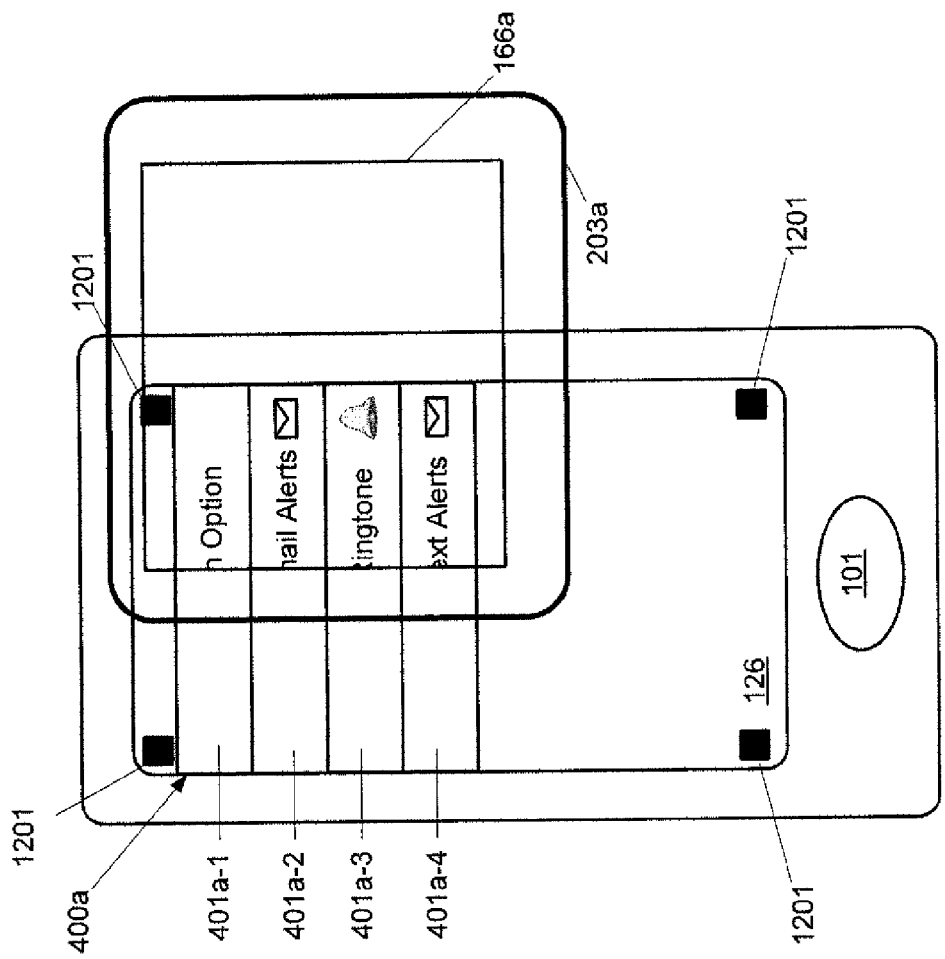
FIG. 12 depicts a perspective view of the mobile device of FIG. 10 and a lens/HUD of the HUD device partially viewing a display of the mobile device, according to non-limiting implementations.

A further alternative implementation is depicted in FIG. 12, which depicts a perspective view of mobile device 101 and lens 203a/HUD 166a of HUD device 103a, similar to FIG. 4; while not all elements of HUD device 103a are depicted in FIG. 12, they are appreciated to be nonetheless present. In these implementations, processor 120a can be further enabled to provide at least one alignment indicator 1201 at display 126a for detection by HUD device 103a (e.g. via detection apparatus 1001), such that HUD device 103a can align the portion displayed at the HUD device, with the remaining portion displayed at display 126a. In depicted implementations alignment indicators 1201 comprise four squares provided at each corner of display 126a, which are detected by detection apparatus 1001 (not depicted in FIG. 12) in an acquired image and processed by processor 120a, which determines that the corners of display 126a are co-located with alignment indicators 1201. Further, while four alignment indicators 1201 are depicted in FIG. 12, in other implementations fewer or more than four alignment indicators can be provided at any location at display 126. In addition, while depicted alignment indicators 1201 comprise squares, in other implementations, alignment indicators 1201 can comprise any suitable shape, and can further include codes such as bar codes and/or QR (Quick Response) codes, and the like.

It is also apparent from FIG. 12 that, method 300 has already been implemented at processor 120a and a GUI 400a, similar to GUI 400 is being as provided at display 126a, GUI 400a comprising fields 401a-1, 401a-2, 401a-3, 401a-4, similar to fields 401. Further, fields 401a-1, 401a-2, 401a-3, 401a-4 will be referred to, hereafter, collectively as fields 401a and generically as a field 401a.

Figure 13:
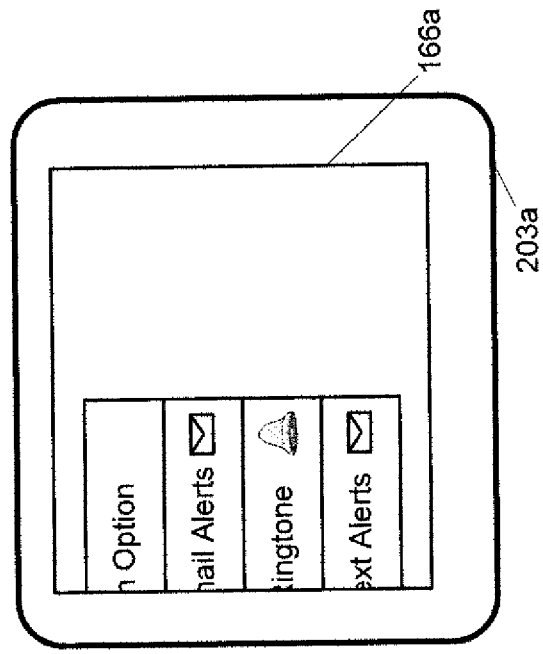
FIG. 13 depicts the lens/HUD of FIG. 12 in isolation from the mobile device, according to non-limiting implementations.

In any event, as depicted in FIG. 12, HUD 166a is only partially aligned with display 126a, and hence only a portion of display data transmitted to HUD device 103a at block 301 of method 300 is provided; specifically, only that portion of display data that aligns with fields 401a is provided. For clarity, content provided at HUD 166a in FIG. 12 are depicted in isolation in FIG. 13 to illustrate that the content is not provided at display 126a but at HUD 166a; rather, the content provide at HUD 166a is provided in alignment with fields 401a.

Figure 14:
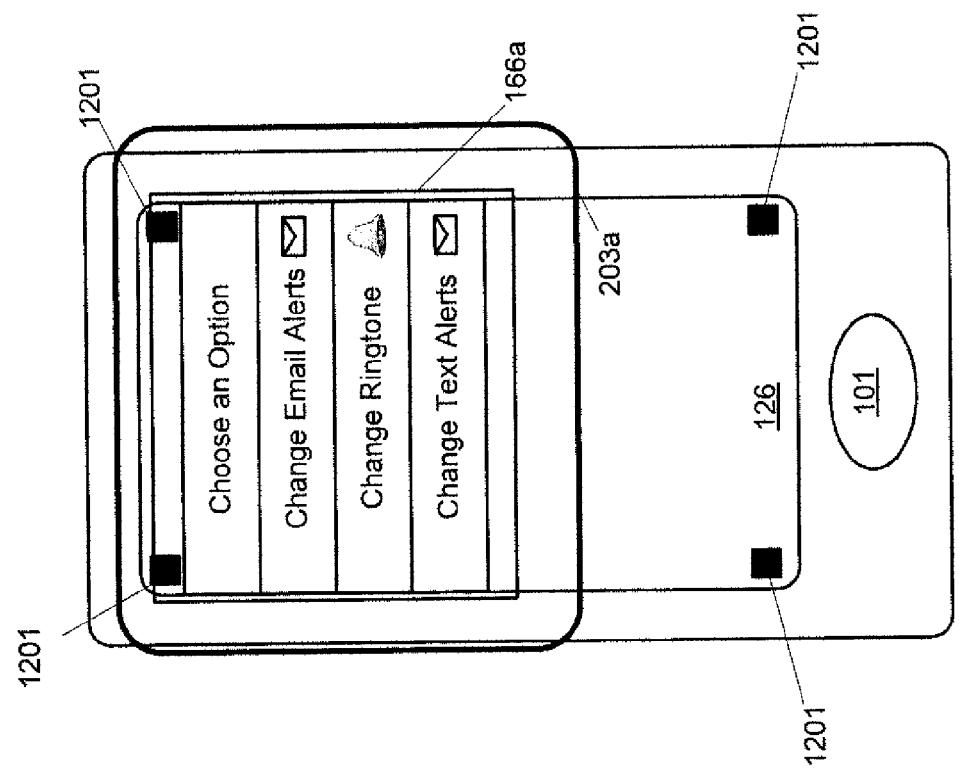
FIG. 14 depicts a perspective view of the mobile device of FIG. 10 and a lens/HUD of the HUD device viewing the display of the mobile device, according to non-limiting implementations.

As depicted in FIG. 14, once HUD 166a is in alignment with display 126a, content provided at HUD 166a is similar to that provided at HUD 166 in FIG. 5. In other words, the content depicted in FIG. 14 is not provided at display 126a; rather, the content is provided at HUD 166a aligned with fields 401a, which are not labelled in FIG. 14 for clarity. Alignment indicators 1201, however, are provided at display 126a.

It is further appreciated at least from FIGS. 12 and 14 that processor 160a is further enabled to: display data at HUD 166a in a virtual plane that is aligned with a physical plane of display 126a of mobile device 101a, such that the display data at HUD 166a appears to be located in fields 401a. In other words, processor 160a can be enabled to determine from a shape and/or size of alignment indicators 1201 a distance and/or plane of display 126a and adjust data provided at HUD 166a accordingly. Hence, for example, as display 126a is moved further from HUD 166a, data at HUD 166a can be made smaller to continue to align with fields 401a; and, similarly, as display 126a is moved closer to HUD 166a, data at HUD 166a can be made larger to continue to align with fields 401a.

Heretofore only implementations of HUD devices comprising wearable glasses, and the like, have been described, however present implementations are not so limited. For example, attention is next directed to FIG. 15 which depicts a schematic perspective diagram of a system 100b which is substantially similar to system 100, with like elements having like numbers, but with a "b" appended thereto. Hence, system 100b comprises a mobile device 101b and a heads-up display (HUD) device 103b for controlling mobile device 101b, according to non-limiting implementations. Mobile device 101b comprises a housing 109b, a processor, a memory, a communications interface, a display 126a, an input device 128a, a speaker, a microphone, and a power source; while only housing 109b, display 126a and input device 128a are depicted, the remaining elements are appreciated to be nonetheless present, for example, internal to mobile device 101b. HUD device 103a comprises a processor, a memory, a communications interface, a HUD 166a and a power source 170a. While only 166a is depicted, the remaining elements are appreciated to be nonetheless present, for example, internal to HUD device 103b. However, in these implementations, HUD device 103b further comprises a vehicular windshield 1500.

In other words, HUD device 103b can be integrated into a dashboard, and the like, of a vehicle, with HUD device 103b integrated into windshield 1500 and/or images from HUD 166 can be projected onto windshield 1500, for example adjacent a steering wheel 1501.

FIG. 15 further depicts a GUI at HUD 166b comprising content associated with a messaging application, with HUD device 103b controlled via input device 128b of mobile device 101b (in contrast to the heretofore described touch screens). For example, input device 128b can comprise a pointing device for moving a pointer 1503, and the like to select one or more of fields 401b; however, when method 300 is implemented at mobile device 101b, pointer 1503 is not displayed at display 126b; rather a portion of display data is transmitted to HUD device 103b via link 175b (e.g. block 301), the display data including data for displaying pointer 1503, so that pointer 1503 is displayed at HUD 166b instead. As input data is received at input device 128b to move pointer 1503 (e.g. block 305), update data is transmitted (e.g. block 307) to HUD device 103b to update a position of pointer 1503. Alternatively, update data is transmitted to HUD device 103b to update the GUI at HUD 166b when input device 128b and pointer 1503 are used to make a selection: for example, as depicted, text ("From: Sue") that would otherwise be located at field 401b-2 has been selected using input device 128b and pointer 1503 as indicated by the text being bold, as compared to other text at HUD 166b.

In any event, presently disclosed are implementations of a mobile device for controlling a HUD device. Specifically, a first portion of display data that would have been displayed at the mobile device, that includes content such as text, graphics, selectable options, and the like, is transmitted to the HUD device for display thereupon; the first portion is not displayed at the mobile device. Rather, a second portion of the display data is displayed at the mobile device that includes fields corresponding to the content displayed at the HUD device. Hence, when interactions with the mobile device occur via an input device, relative locations of the fields displayed at the mobile device are the same as the relative locations of the content displayed at the HUD device and a user can hence appreciate a location to move a hand and/or a pointer to make a selection at mobile device that is then reflected in the display data provided at the HUD device. In this manner a convenient method of controlling a HUD device is provided: rather than use awkward voice commands and/or eye movement and/or head movements and the like to control HUD device, mobile device can be used as an input device for the HUD device. However, present implementations also provide a convenient method of maintaining privacy at the mobile device by displaying content at the HUD device and not at the mobile device. Hence, the HUD device can effectively be used as an external display for the mobile device.

Those skilled in the art will appreciate that in some implementations, the functionality of mobile devices 101, 101a, 101b and HUD devices 103, 103a, 103b can be implemented using pre-programmed hardware or firmware elements (e.g., application specific integrated circuits (ASICs), electrically erasable programmable read-only memories (EEPROMs), etc.), or other related components. In other implementations, the functionality of mobile devices 101, 101a, 101b and HUD devices 103, 103a, 103b can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A heads-up display (HUD) device comprising:
a processor, a HUD, a detection apparatus configured to detect a display device of a mobile device, and a communication interface, the processor configured to:
receive from the mobile device, via the communication interface, a first layer of display data for display at the HUD, the first layer of display data comprising one or more of selectable options, content text, and icons and not including graphical indicators of fields that would otherwise be displayed at the mobile device;
determine, via the detection apparatus, a position of the display device of the mobile device relative to the HUD by detecting at least one alignment indicator provided at the display device of the mobile device;
display the first layer of display data at the HUD in alignment with a second layer of the display data displayed at the display device of the mobile device, the second layer of display data comprising graphical indicators of fields, each graphical indicators of fields representing a field where a selectable option, content text, and icon would be located if the first layer of display data and the second layer of display data were displayed concurrently; and
when the HUD is only in partial alignment with the second layer of the display data displayed at the display device of the mobile device, as determined from the at least one alignment indicator, display only that portion of the first layer that aligns with the graphical indicators of the fields of the second layer.

2. The HUD device of claim 1, wherein the processor is further configured to:
receive from the mobile device, via the communication interface, an updated first layer of display data for display at the HUD device; and,
display the updated first layer of display data at the HUD of the HUD device.

3. The HUD device of claim 1, wherein the processor is further configured to:
establish, via the communication interface, a link for communication with the mobile device such that the HUD device is controllable by the mobile device via the link.

4. The HUD device of claim 1, wherein the processor is further configured to: display the first layer of the display data at the HUD in a virtual plane that is aligned with a physical plane of the mobile device.

5. The HUD device of claim 1, wherein the processor is further configured to determine the position of display of the mobile device relative to the HUD device by detecting, via the detection apparatus, one or more of a shape of the display device of the mobile device and at least one alignment indicator provided at the display device.

6. The HUD device of claim 1, further comprising wearable glasses.

7. The HUD device of claim 1, further comprising a vehicular windshield.

8. A method comprising:
receiving from a mobile device, at a communication interface of a heads-up display (HUD) device, a first layer of display data for display at a HUD of the HUD device, the first layer of display data comprising one or more of selectable options, content text, and icons and not including graphical indicators of fields that would otherwise be displayed at the mobile device; determining, via a detection apparatus of the HUD device, a position of a display device of the mobile device relative to the HUD;
displaying the first layer of display data at the HUD in alignment with a second layer of the display data displayed at the display device of the mobile device, the second layer of display data comprising graphical indicators of fields, each graphical indicators of fields representing a field where a selectable option, content text, and icon would be located if the first layer of display data and the second layer of display data were displayed concurrently; and
when the HUD is only in partial alignment with the second layer of the display data displayed at the display device of the mobile device, as determined from the at least one alignment indicator, display only that portion of the first layer that aligns with the graphical indicators of the fields of the second layer.

9. The method of claim 8, further comprising:
receiving, via the communication interface from the mobile device, an updated first layer of display data for display at the HUD; and,
displaying the updated first layer of display data at the HUD.

10. The method of claim 8, further comprising:
establish, via the communication interface, a link for communication with the mobile device such that the HUD device is controllable by the mobile device via the link.

11. A computer program product, comprising a non-transitory computer-readable medium storing a computer readable program code executable by a processor of a heads-up display (HUD) to implement a method for:
receiving from a mobile device, at a communication interface of a heads-up display (HUD) device, a first layer of display data for display at a HUD of the HUD device, the first layer of display data comprising one or more of selectable options, content text, and icons and not including graphical indicators of fields that would otherwise be displayed at the mobile device;
determining, via a detection apparatus of the HUD device, a position of a display device of the mobile device relative to the HUD;
displaying the first layer of display data at the HUD in alignment with a second layer of the display data displayed at the display device of the mobile device, the second layer of display data comprising graphical indicators of fields, each graphical indicators of fields representing a field where a selectable option, content text, and icon would be located if the first layer of display data and the second layer of display data were displayed concurrently; and
when the HUD is only in partial alignment with the second layer of the display data displayed at the display device of the mobile device, as determined from the at least one alignment indicator, display only that portion of the first layer that aligns with the graphical indicators of the fields of the second layer.

12. A system comprising:
a mobile device in communication with a heads-up display (HUD) device, the mobile device configured to:
transmit a first layer of display data to the HUD device for display at the HUD device; display a second layer of the display data at the display device without displaying the first layer of display data, the second layer comprising one or more graphical indicators of fields, each graphical indicators of fields representing a field where a selectable option, content text, and icon would be located if the first layer of display data and the second layer of display data were displayed concurrently; and provide at least one alignment indicator at the display device for detection by the HUD device to enable the HUD device to align the one or more selectable options, content text, and icons displayed at the HUD device, with the one or more graphical indicator of fields displayed at the display device, the at least one alignment indicator different from the first layer and the second layer, and provided independently therefrom; and,
the HUD device configured to:
receive from the mobile device the first layer of the display data for display at a HUD of the HUD device; determine, via a detection apparatus of the HUD device, a position of a display device of the mobile device relative to the HUD by detecting the at least one alignment indicator provided at the display device of the mobile device; display the first layer of display data at the HUD of the HUD device in alignment with the second layer of the display data displayed at the display device of the mobile device; and when the HUD is only in partial alignment with the second layer of the display data displayed at the display device of the mobile device, as determined from the at least one alignment indicator, display only that portion of the first layer that aligns with the graphical indicators of the fields of the second layer.

* * * * *